(12) United States Patent
Pintossi

(10) Patent No.: US 11,892,099 B2
(45) Date of Patent: Feb. 6, 2024

(54) GAS COCK FOR GAS BURNER

(71) Applicant: PEL PINTOSSI EMILIO S.P.A., Brescia (IT)

(72) Inventor: Ivano Pintossi, Brescia (IT)

(73) Assignee: PEL PINTOSSI EMILIO S.P.A., Brescia (IT)

(*) Notice: Subject to any disclaimer, the term of this patent is extended or adjusted under 35 U.S.C. 154(b) by 185 days.

(21) Appl. No.: 17/436,527

(22) PCT Filed: Mar. 2, 2020

(86) PCT No.: PCT/IB2020/051748
§ 371 (c)(1),
(2) Date: Sep. 3, 2021

(87) PCT Pub. No.: WO2020/178707
PCT Pub. Date: Sep. 10, 2020

(65) Prior Publication Data
US 2022/0178451 A1    Jun. 9, 2022

(30) Foreign Application Priority Data

Mar. 4, 2019    (IT) .......................... 102019000003109

(51) Int. Cl.
    *F16K 5/02*    (2006.01)
    *F16K 5/10*    (2006.01)
    *F23N 1/00*    (2006.01)

(52) U.S. Cl.
    CPC ............ *F16K 5/0207* (2013.01); *F16K 5/106* (2013.01); *F23N 1/007* (2013.01)

(58) Field of Classification Search
    CPC ........ F16K 5/0207; F16K 5/106; F23N 1/007; F23N 2235/16; F23N 2235/24; F23K 2900/05002

(Continued)

(56) References Cited

U.S. PATENT DOCUMENTS 2,763,289 A * 9/1956 Mueller ................... F16K 5/12
                                                    137/599.08
2,855,956 A * 10/1958 Huff ......................... F16K 5/12
                                                    137/625.47

(Continued)

FOREIGN PATENT DOCUMENTS

| CN | 101103229 A | 1/2008 |
| CN | 102052485 A | 5/2011 |
| EP | 3 163 167 A1 | 5/2017 |

OTHER PUBLICATIONS

Machine translation of CN 102052485 A (Zhejiang Xintao Electronic Machinery Co Ltd) dated May 11, 2011 (Year: 2011).*

(Continued)

*Primary Examiner* — Craig J Price
*Assistant Examiner* — Andrew J Rost
(74) *Attorney, Agent, or Firm* — Merchant & Gould P.C.

(57) ABSTRACT

A gas cock for a gas burner and pilot flame includes a cock body with a plug receiving seat and a gas passage opening for passage of gas from/to the plug receiving seat. The cock has a conical plug, including a side wall extending around a central conical plug axis and housed in the plug receiving seat. The conical plug includes a plug opening for passage of gas from/to the plug receiving seat by the inner cavity of the conical plug based on a presettable angle of rotation between the cock body and the conical plug. The conical plug outer wall surface includes a groove connected to the plug opening. The groove includes a modulating portion extending between first and second angular positions in a circumferential direction of rotation of the conical plug with a depth that increases or decreases in the radial direction perpendicular to the side wall.

8 Claims, 10 Drawing Sheets

(58) Field of Classification Search
USPC .......................................... 251/310, 208–209
See application file for complete search history.

(56) References Cited

U.S. PATENT DOCUMENTS

| | | | | |
|---|---|---|---|---|
| 4,947,891 | A * | 8/1990 | Genbauffe | F16K 5/10 |
| | | | | 137/601.19 |
| 5,009,393 | A * | 4/1991 | Massey | F16K 15/12 |
| | | | | 251/207 |
| 8,281,780 | B2 * | 10/2012 | Carvalho | F23N 1/007 |
| | | | | 431/18 |
| 10,871,235 | B1 * | 12/2020 | Huang | F16K 31/041 |
| 2002/0033464 | A1 * | 3/2002 | Harneit | F16K 5/103 |
| | | | | 251/207 |
| 2013/0260327 | A1 | 10/2013 | Oliva Aguayo et al. | |
| 2014/0252253 | A1 * | 9/2014 | Huang | F16K 5/0214 |
| | | | | 215/310 |
| 2015/0330629 | A1 * | 11/2015 | Albizuri Landazabal | ............ |
| | | | | F16K 5/103 |
| | | | | 251/207 |
| 2016/0102867 | A1 * | 4/2016 | Huang | F23N 1/007 |
| | | | | 251/286 |
| 2016/0356493 | A1 * | 12/2016 | Xie | F16K 11/083 |
| 2017/0114908 | A1 * | 4/2017 | Huang | F16K 5/0207 |

OTHER PUBLICATIONS

International Search Report and Written Opinion of the International Searching Authority for International Patent Application No. PCT/IB2020/051748 dated Apr. 24, 2020, 10 pages.

Italian Search Report for Italian Patent Application No. 102019000003109 dated Oct. 22, 2019, 2 pages.

* cited by examiner

GAS COCK FOR GAS BURNER

CROSS-REFERENCE TO RELATED APPLICATION

This application is a National Stage Application of PCT/IB2020/051748, filed 2 Mar. 2020, which claims benefit of Ser. No. 10/219,000003109, filed 4 Mar. 2019 in Italy, and which applications are incorporated herein by reference. To the extent appropriate, a claim of priority is made to each of the above-disclosed applications.

FIELD OF APPLICATION

The invention relates to a gas cock comprising a plug or a rotary element, in particular a gas plug or rotary element, in particular for professional apparatuses.

PRIOR ART

It is known that, in addition to the pilot flame position and the full gas position, gas cocks for professional hob burners comprise a minimum position, which is obtained by continuing to turn the rotary element of the cock in the direction of the opening.

In professional cocks for burners from the prior art, the minimum and the maximum rate are dependent on the shape and the cross section of a hole that is appropriately located in the side wall of the plug.

These positions of the cock are fixed and therefore do not allow the gas to be progressively supplied between the full gas position and the minimum gas position, thereby making it more difficult for an operator to finely adjust the cooking temperature of the food.

SUMMARY OF THE INVENTION

There is therefore the need to overcome the limitations and disadvantages cited with reference to the prior art, and in particular there is the need to be able to finely adjust the cooking temperature by supplying gas to the burner in a more fine and controlled manner.

Furthermore, there is the need to also be able to accurately adjust the flow of gas during the burner adjustment intervals for low gas rates (low cooking temperature).

Another object of the present invention is to be able to finely adjust the gas rate without the need for complicated means for electronically adjusting the flow of gas, thus attempting to maintain a simple and robust mechanical design of the cock.

This requirement is met by a gas cock for a burner, by a hob and by an oven.

DESCRIPTION OF THE DRAWINGS

Additional features and the advantages of the present invention will become clearer from the description given below of preferred and non-restrictive embodiments thereof, in which.

DETAILED DESCRIPTION

Figure 1:
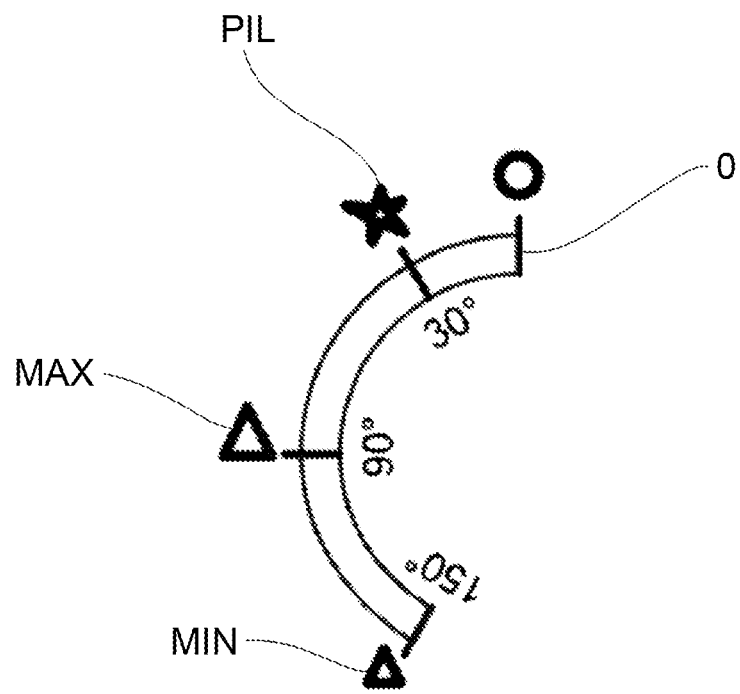
FIG. 1 is a schematic view of the position of a knob for a cock according to the prior art.

FIG. 1 shows the positions of a knob of a typical gas cock for a professional burner from the prior art. As can be seen, the knob can be rotated between a "0" position, in which no gas is supplied (burner off), a PIL position, in which the gas is guided towards the duct that carries the gas to the pilot flame of the burner, a fixed position MAX (at 90° in FIG. 1), in which a preset maximum gas flow is supplied, and a fixed position MIN (at 150° in the figure), in which a minimum gas flow is supplied that is preset by the gas cock manufacturer.

Figure 2:
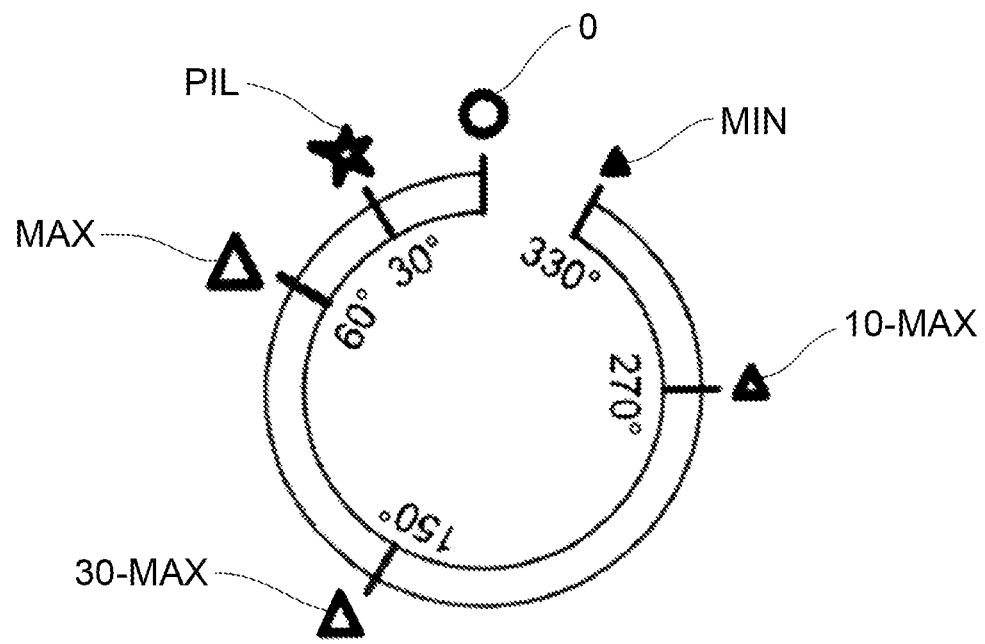
FIG. 2 is a schematic view of the positions of a knob of a gas cock according to one embodiment of the present invention.
Figure 3:
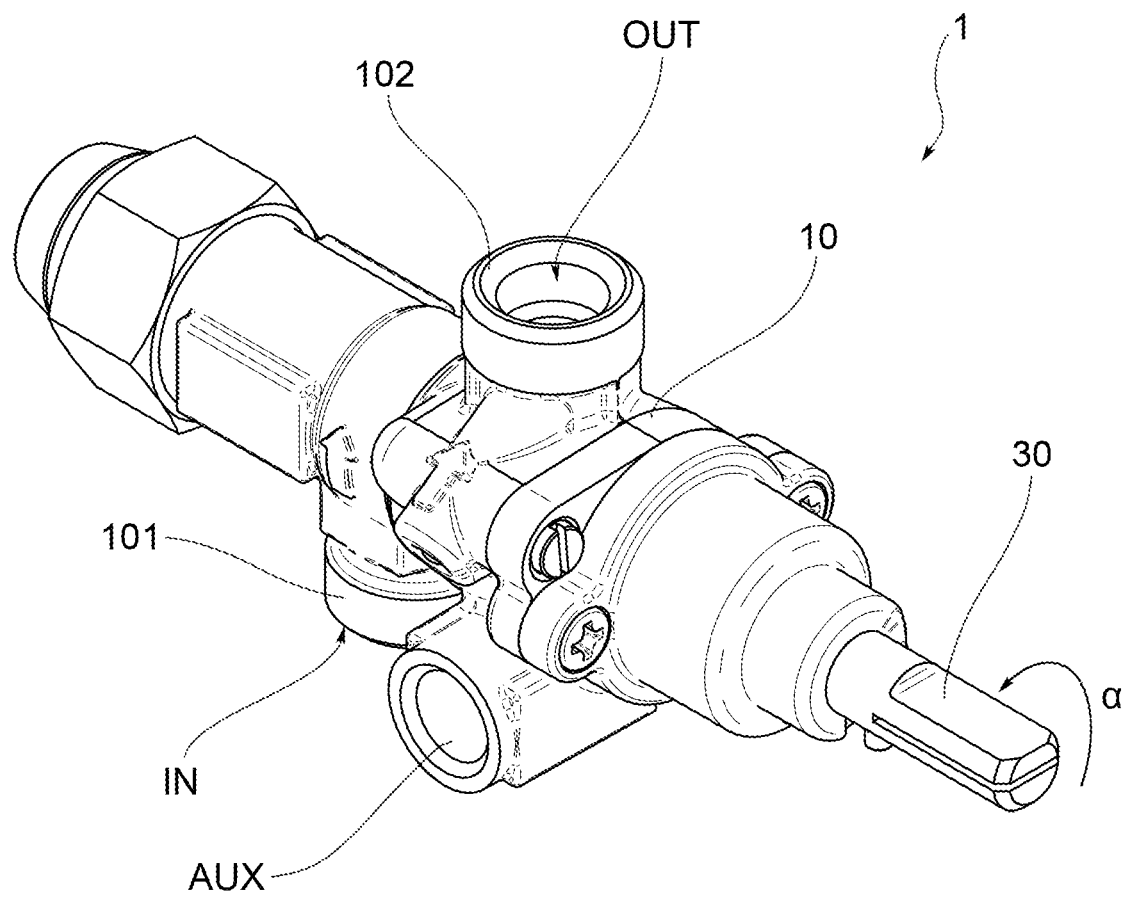
FIG. 3 is an axonometric view of a gas cock for a burner according to one embodiment of the present invention.
Figure 4:
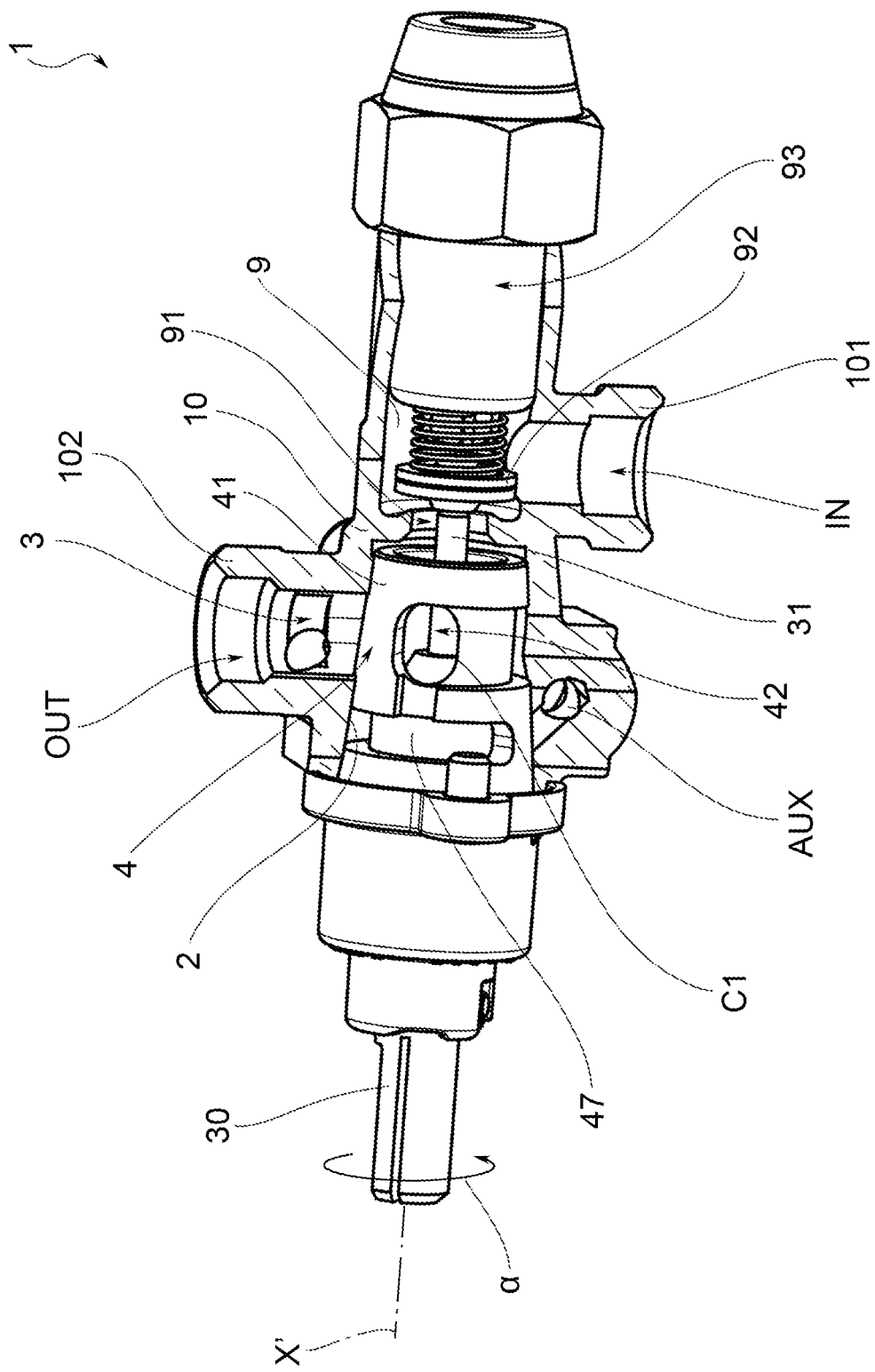
FIG. 4 shows a cross section of an axonometric view of the gas cock in FIG. 3 in a configuration in which the pin and the extension of the pin are positioned such that a shutter of a thermocouple is open in order to ignite a burner that may be connected to the cock.
Figure 5:
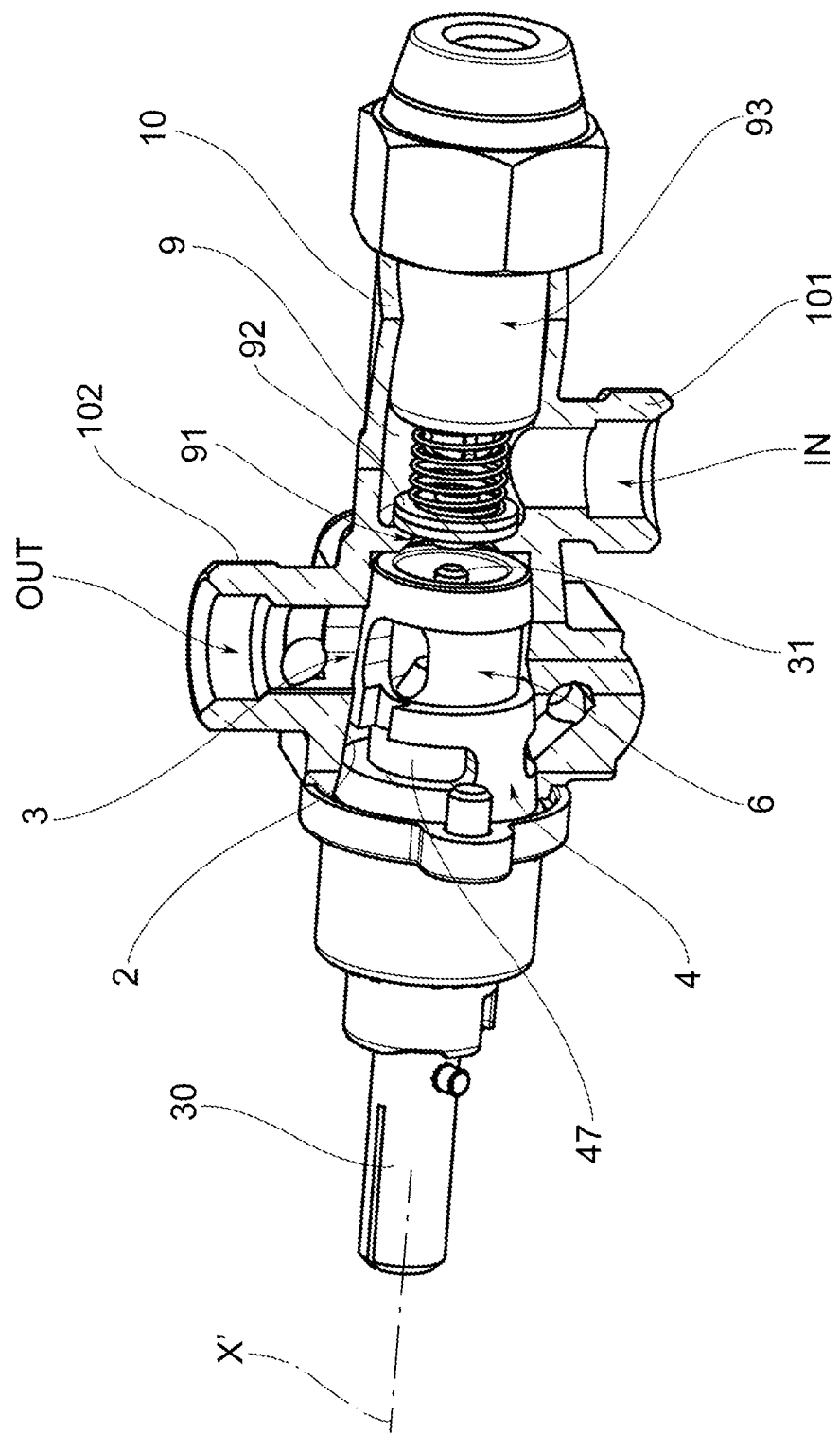
FIGS. 5 to 8 show a cross section of an axonometric view of the gas cock in FIG. 3 in successive configurations in which the gas cock plug (and therefore also the pin) is rotated, in particular in the following sequence: a maximum flow position MAX, a 30% of the maximum flow position 30-MAX, a 10% of the maximum flow position 10-MAX and a minimum position MIN.
Figure 6:
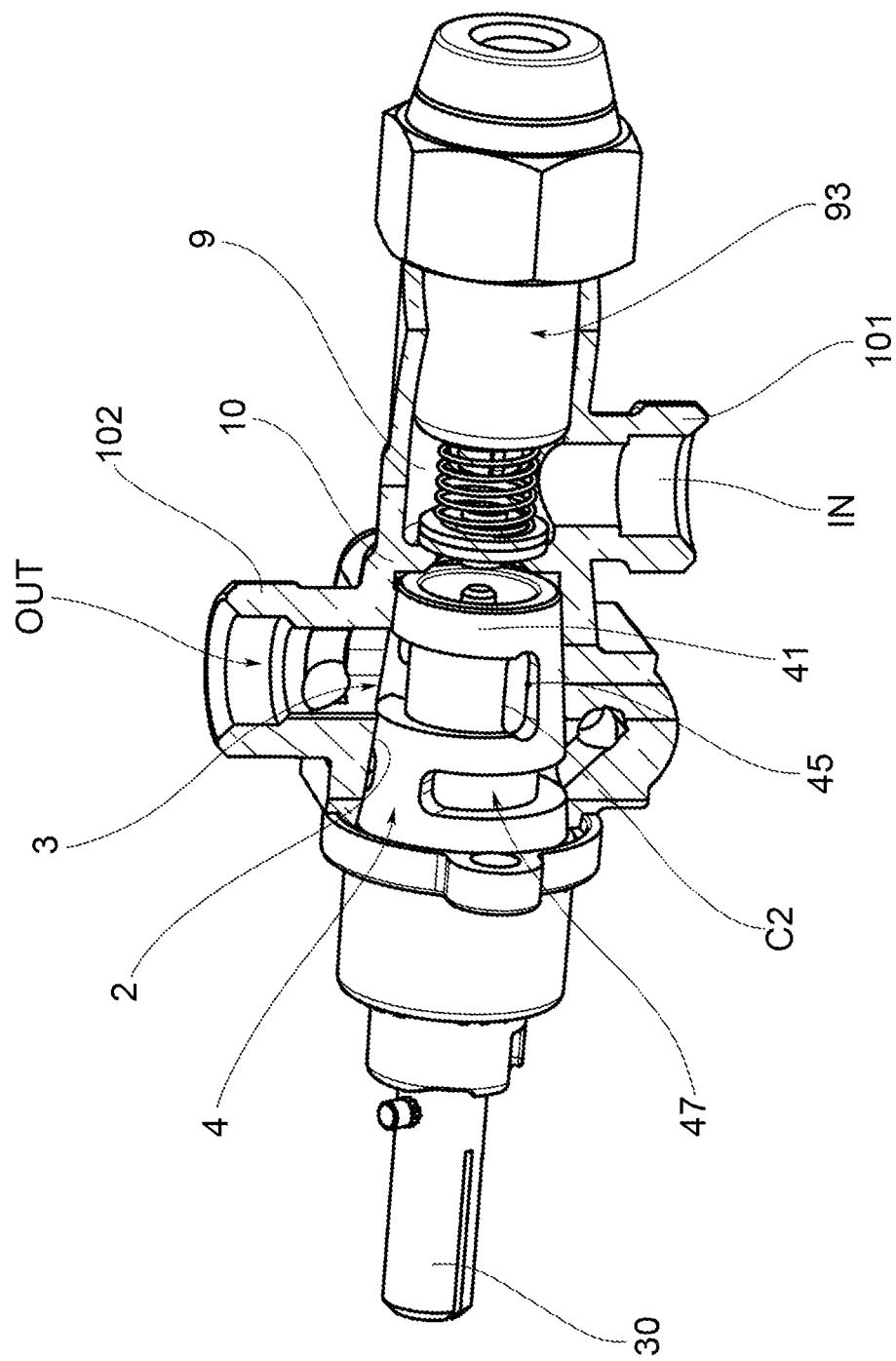
Figure 7:
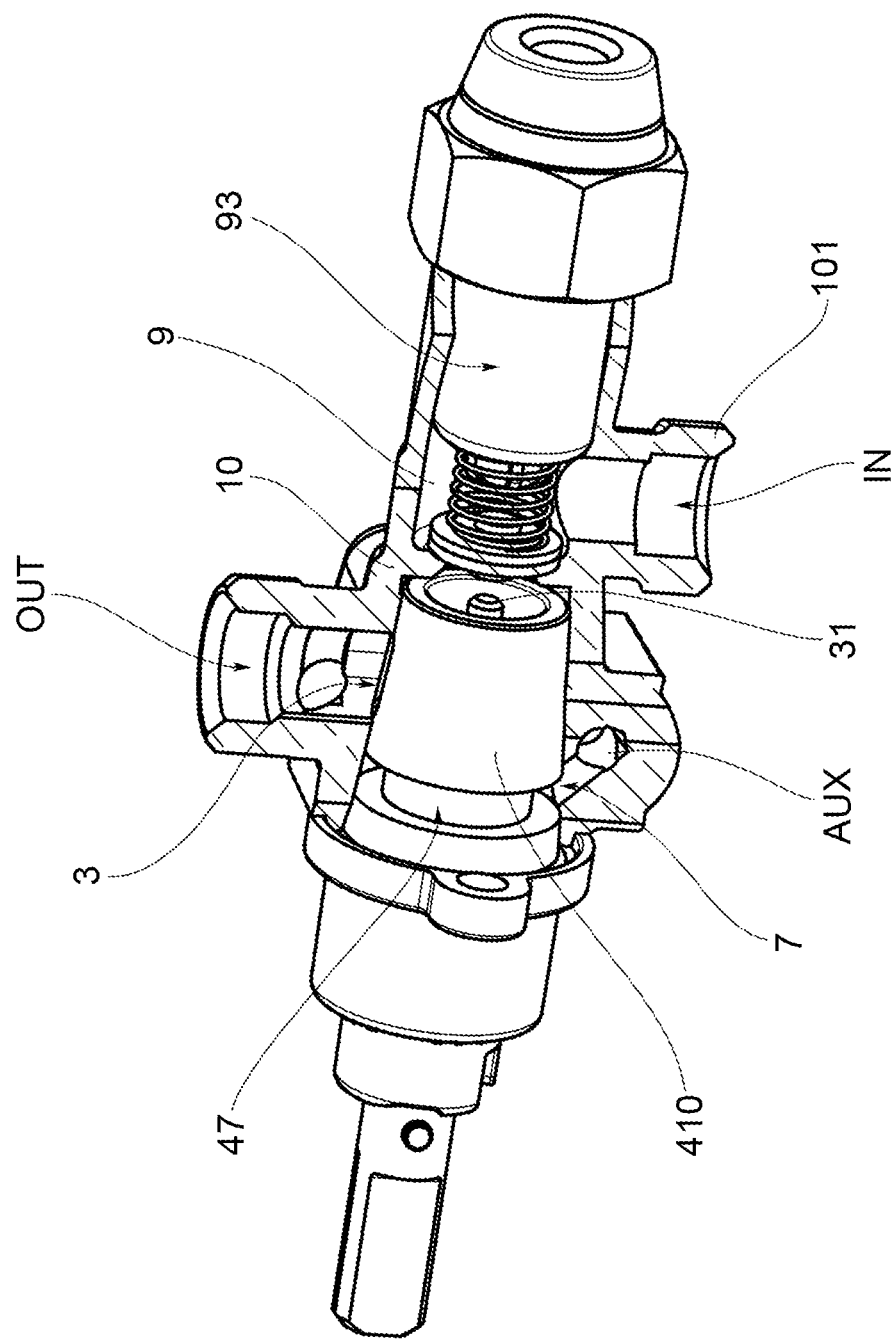
Figure 8:
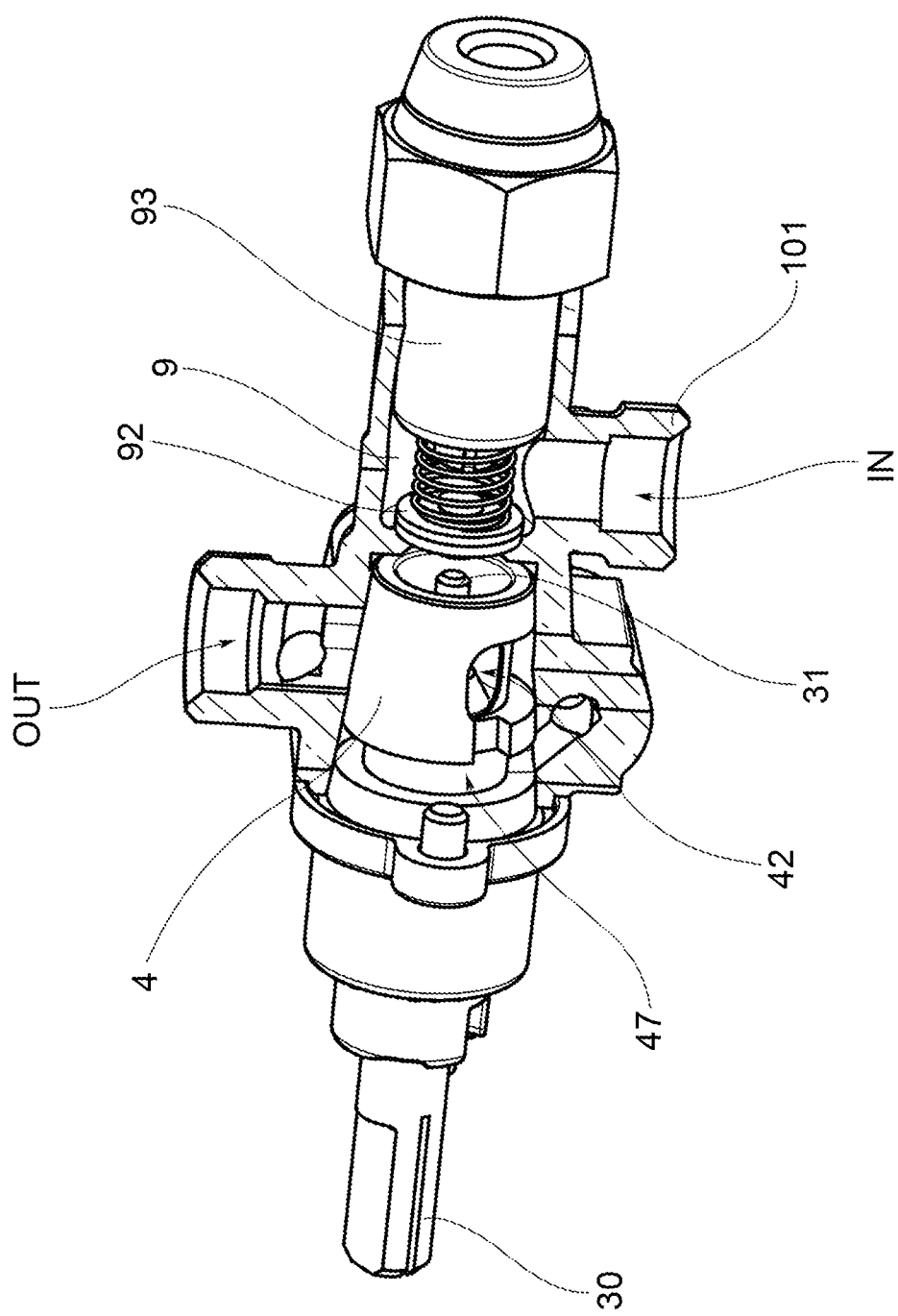

FIG. 2 instead shows the positions of a knob of a gas cock according to the present invention, which can be connected to a gas burner. As can be seen, the knob can be rotated between a "0" position, in which no gas is supplied (burner off), a PIL position, in which the gas is guided towards the duct that carries the gas to the pilot flame of the burner, an initial position MAX (at 60° in FIG. 2), in which a maximum gas flow is supplied, an end position F (at 330° in FIG. 2), in which a minimum gas flow is supplied and (ideally) an infinite number of intermediate positions between the initial position MAX and the end position F, in which the flow of gas can be varied between the maximum and the minimum flow either fully continuously or at least in intervals. For example, FIG. 2 shows that, according to one variant of the cock, in a position 30-MAX (at 150° in FIG. 2), a flow is supplied that is approximately 30% of the maximum flow, and at a position 10-MAX (at 270° in FIG. 2), a flow is supplied from the cock that is approximately 10% of the maximum flow.

The technical features of a gas cock 1 for a burner according to the present invention will be described in detail in the rest of the description, which features make it possible to adjust the flow of gas as mentioned above.

In accordance with the attached figures, reference numeral 1 indicates, as a whole, a gas cock for a gas burner, in particular a cock having a conical plug for a professional gas burner that is provided with a pilot flame.

The gas cock of the present invention is preferably a professional gas cock, that is it is suitable for connection to a burner of a professional gas stove. Preferably, the professional gas cock is designed to ensure a gas rate of at least 1.3 m3/h for a pressure of 1 mbar for town gas (for example a gas G110), or to ensure at least a rate of 1.2 m3/h for a pressure of 1 mbar for G20 methane, or to ensure at least a rate of 1.5 m3/h for a pressure of 1 mbar for G30 butane.

It is therefore clear that, in the present discussion, that the term "gas" is meant in its most generic sense, thereby being able to relate to methane gas, butane gas, an air/gas mixture or just air, or a gas intended for the burner.

The gas cock 1 comprises a cock body 10, which is preferably made in one piece, for example made of a brass alloy. A plug receiving seat 2 and a gas passage opening 3 for the passage of the gas from or to the plug receiving seat 2 are made in the cock body 10.

The gas cock 1 also comprises a conical plug 4, which comprises a side wall 41 that extends around a central conical plug axis X. This side wall 41 is therefore truncated cone-shaped. The side wall 41 is housed in a gas-tight manner in the plug receiving seat 2. In particular, the side wall 41 is rotatably and sealingly housed in the plug receiving seat 2 and can rotate about the central plug axis X.

Therefore, the plug receiving seat 2 is also truncated cone-shaped, at least in part.

The side wall 41 comprises an inner wall surface 410, which defines an inner cavity 43 of the conical plug 4 and an outer wall surface 411, which is opposite the inner wall surface 410. In particular, the inner cavity 43 is a cavity that passes inside the conical plug 4 in the axial direction of the central plug axis X.

The conical plug 4 also comprises a plug opening 42 for the passage of gas from or to the plug receiving seat 2 through the inner cavity 43 on the basis of a presettable angle of rotation a between the cock body 10 and the conical plug 4. In other words, the gas originating from a gas supply system (not shown in the figures) initially passes into the inner cavity 43, then through the plug opening 42 and passes into the plug receiving seat 2, or, according to an alternative variant (not shown), the gas originating from a gas supply system initially passes into the plug opening 42 towards the plug receiving seat 2 and therefore into the inner cavity 43 towards a different portion of the cock body.

A groove 6 that is connected to the plug opening 42 is made in the outer wall surface 411 of the side wall 41 of the conical plug 4.

This groove 6 is suitable for being positioned, at least in part, in the region of the gas passage opening 3 of the cock body 10 on the basis of the presettable angle of rotation a. In particular, depending on the angular position of the conical plug 4, when at least part of the groove 6 is in communication with the gas passage opening 3, fluid communication is obtained between the inner cavity 43, the plug receiving seat 2 and the gas passage opening 3.

In accordance with the invention, the groove 6 comprises at least one modulating portion M that predominantly extends between a first angular position C1 and a second angular position C2 in a circumferential direction C of rotation of the conical plug 4. The depth H of the groove 6 either increases or decreases between the first angular position C1 and the second angular position C2. The depth H is intended to be measured in the radial direction R, which is perpendicular to the side wall 41.

In this way, depending on the angular position of the conical plug 4 with respect to the cock body 10, the rate of gas passing from the inner cavity 43 to the conical plug receiving seat 2, and therefore to the gas passage opening 3, is modulated.

According to a preferred variant, the groove 6 has a depth H that monotonically increases or monotonically decreases between the first angular position C1 and the second angular position C2. This guarantees almost continuous modulation of the gas flow depending on the angular position of the conical plug 4 with respect to the cock body 10.

The groove 6 is preferably a blind groove at least in the portion between the first angular position C1 and the second angular position C2.

In accordance with a preferred embodiment, the groove 6 has a cross section that lies on a plane that is perpendicular to the central plug axis X and has a substantially "0" or "U" or "V" shape or equivalent, in which the open region faces towards the outer wall surface 411. In other words, the open region of the "0" or "U" or "V" shape faces the plug receiving seat 2.

The modulating portion M preferably extends in the circumferential direction at a portion angle β that is greater than 90° or, even more preferably, at a portion angle β that is greater than 150°, for example 170°. This degree of angular extension of the groove makes it possible to suitably and finely modulate the gas rate on the basis of the relative rotation between the conical plug and the plug receiving seat 2.

The groove 6 preferably has a transverse dimension T, which is parallel to the central conical plug axis X and is smaller than or equal to the transverse dimension T1 of the plug opening 42.

At the point of greatest depth H of the groove 6 in the modulating portion M, for example in the first angular position C1, the relationship between the depth H and the thickness of the side wall 41 of the conical plug 4 is preferably between 0.7 and 0.9, preferably 0.875. At the same time as, or independently from, the above-mentioned relationship, at the point of smallest depth H of the groove 6 in the modulating portion M, for example in the second angular position C2, the relationship between the depth H and the thickness of the side wall 41 of the conical plug 4 is between 0.2 and 0.4, preferably 0.375.

In the above-mentioned cases, the thickness of the side wall 41 is intended to be measured as the distance between the inner wall surface 410 of the conical plug 4 and the outer wall surface 411.

In accordance with an advantageous variant, a blind pocket 45 is made downstream of the second angular position C2 in the direction that proceeds from the greatest depth H to the smallest depth H of the groove 6, which has a pocket depth H1 that is greater than the depth H of the groove 6 when measured in the second angular position C2.

The presence of the blind pocket 45 makes it possible to be able to collect any lubricant excess that is between the conical plug 4 and the plug receiving seat 2 during the relative rotation thereof so as not to reduce or even interrupt the correct flow of gas through the groove 6.

According to one variant, an angular distance of at least 170°, preferably at least 180°, is preferably provided between the furthest point of the plug opening 42 and the furthest point of the blind pocket 45, which distance is measured in the circumferential direction.

The conical plug 4 preferably comprises an auxiliary groove 47, which is at a spacing from the groove 6 in the axial direction of the central plug axis 6.

This auxiliary groove 47 mainly extends in the circumferential direction C and is designed for the passage of gas towards an auxiliary opening 7 made in the cock body 10, which is different from the gas passage opening 3 and is intended for supplying a gas rate that is smaller than the gas rate of the gas passage opening 3. This auxiliary groove 47 is preferably intended for the passage of gas towards an auxiliary channel AUX made in the cock body 10 and is connected to the auxiliary opening 7 in order to supply gas to the nozzle of a pilot flame on the gas burner.

According to a preferred embodiment, the cock body 10, which is preferably formed as one piece, predominantly extends along a body axis X', and, in addition to the plug receiving seat 2, comprises a thermocouple receiving cavity 9 that communicates with the plug receiving seat 2. The thermocouple receiving cavity 9 is preferably tubular and arranged coaxially with the body axis X', for example such that the body axis X' coincides with the central plug axis X. The thermocouple receiving cavity 9 is in communication with the plug receiving seat 2 by means of a window 91 in which a shutter 92 of a thermocouple 93, which may be housed in the thermocouple receiving cavity 9, can selectively sealingly engage.

It should be noted that, in FIGS. 5 to 9, in order to simplify the representation, the shutter 92 is always shown closing the window 91. However, it is clear that the thermocouple 9 needs to be activated so that the shutter 92 does not engage with the window 91 in order for gas to pass from the thermocouple receiving cavity 9 to the inner cavity 43 of the shutter.

The cock body 10 also comprises a gas inlet IN that is in direct fluid communication with the thermocouple receiving cavity 9 so that gas can enter the cock body 10 from a gas supply system.

The gas inlet IN is, for example, a tubular extension 101 that projects in the radial direction from the tubular wall that defines the thermocouple receiving cavity 9.

The cock body 10 also comprises a gas outlet OUT that is in direct fluid communication with the gas passage opening 3, and, therefore, with the plug receiving seat 2.

The gas outlet OUT is, for example, a tubular extension 102 that projects in the radial direction from the seat wall 21 that defines the plug receiving seat 2.

Furthermore, the auxiliary channel AUX, which is intended for the passage of gas to the nozzle for the pilot flame, is preferably a tubular channel, a portion of which extends perpendicularly to both the gas inlet IN and the gas outlet OUT, thereby allowing a compact cock body to be formed.

The conical plug 4 is preferably integrally coupled to a pin 30, which projects from the cock body 10 and to which a knob is fixed that is manually rotated by the operator.

Figure 9:
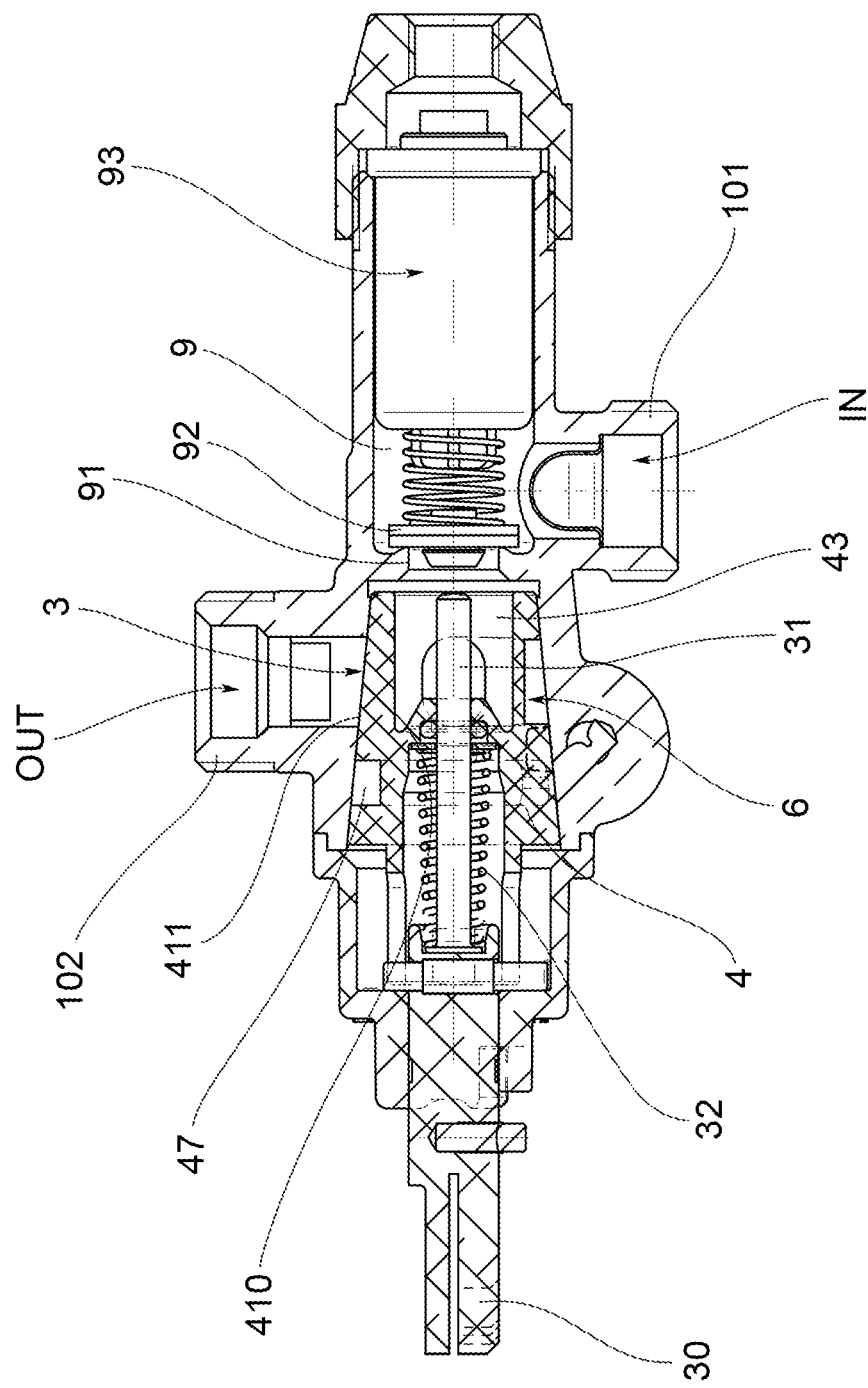
FIG. 9 is a longitudinal sectional view of the gas cock in FIG. 3.
Figure 10:
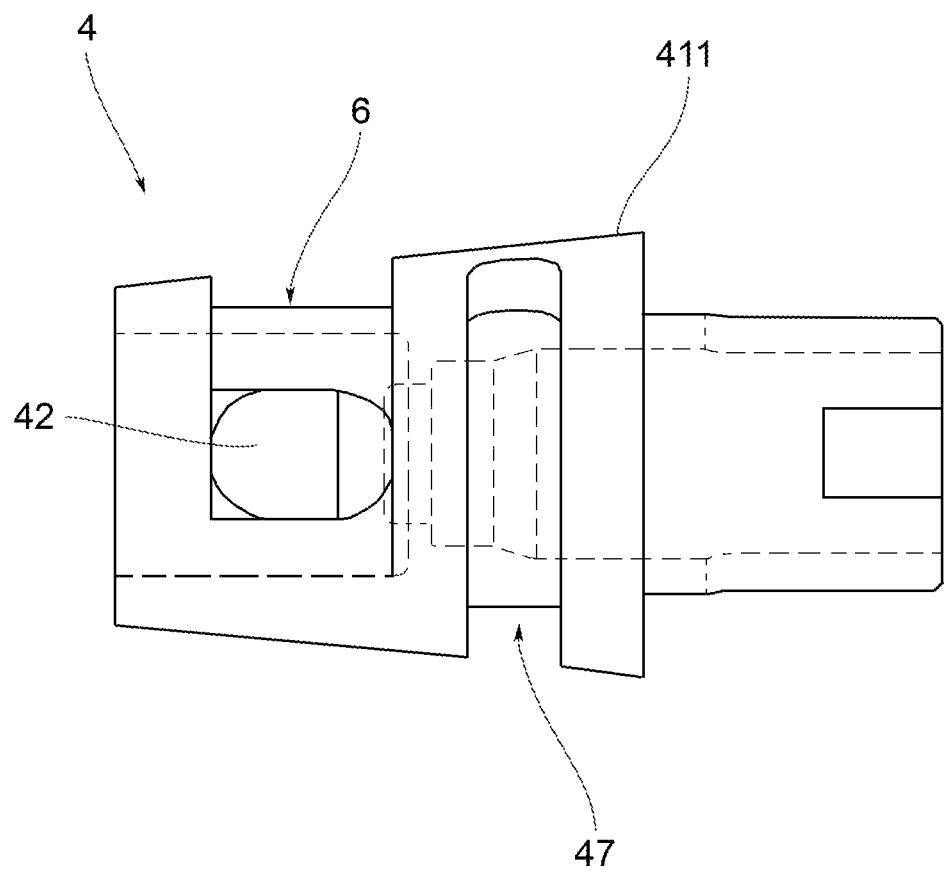
FIG. 10 is a planar view of a conical plug according to one embodiment of the present invention.
Figure 11:
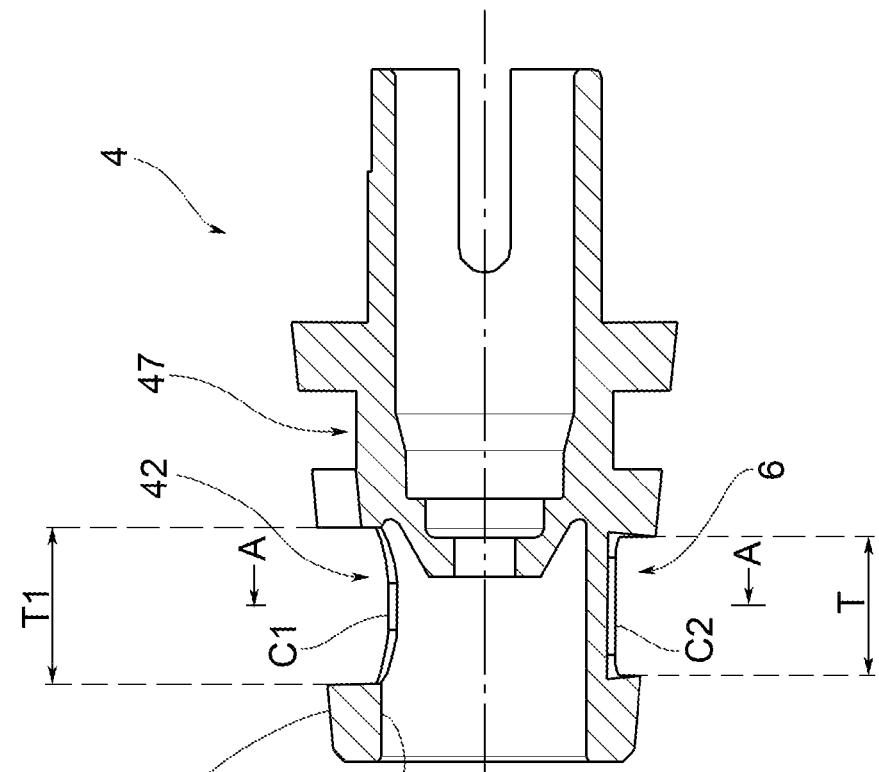
FIG. 11 is a longitudinal sectional view of the conical plug in FIG. 10.
Figure 12:
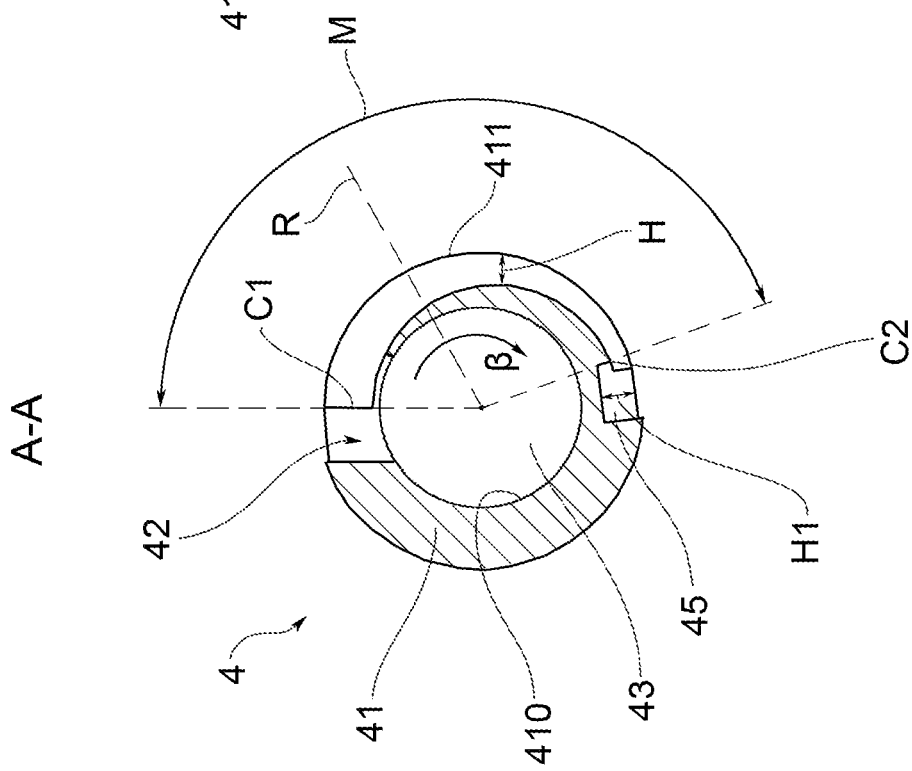
FIG. 12 is a transverse sectional view along the plane A-A in FIG. 11 of the conical plug in FIG. 10.

Preferably, the pin 30 comprises an extension 31, which extends inside the inner cavity 43 of the conical plug 4, which plug, in a configuration that is advanced with respect to a base configuration, is suitable for pushing the shutter 92 of the thermocouple 93 so as to open the passage of gas from the thermocouple receiving cavity 9 to the inner cavity 43 of the conical plug 4. This configuration is used for the initial passage of gas when igniting the burner (or the pilot flame). A return spring 32 is preferably placed around the extension 31, as shown in FIG. 9, for example.

Once the burner has been ignited, electrical consent is sent to the thermocouple such that the shutter is, and remains, disengaged from the window 91 in order to allow the passage of gas.

It is clear that the present invention is also aimed at a professional gas hob having a gas burner, in which the supply of gas to the burner is adjusted by means of the gas cock for a burner that is described in the preceding paragraphs.

Similarly, it is clear that the present invention also refers to a gas oven comprising a gas burner, in which the supply of gas to the burner is adjusted by means of the gas cock for the gas burner 1 described so far.

Innovatively, the present invention makes it possible to adjust the rate of outgoing gas on the basis of the angular position of the conical plug (and therefore of the knob) more finely. This also makes it possible to be able to suitably adjust and preset the cooking temperature of the food in a professional gas burner.

Furthermore, the large rotation capacity of up to 330° of the pin (knob) of the gas cock and, consequently, of the conical plug 4, allows for accurate and stable modulation of the cooking flame.

In particular, the particular geometry of the groove, which has a continuously variable depth and is substantially milling on a conical plug made of one piece in the preferred embodiment thereof, makes it possible to maintain a stable flame for the entire modulation angle from the first angular position C1 to the second angular position C2.

In particular, a constant modulation ratio is guaranteed over the entire modulating portion of the groove. This modulating ratio is preferably 1:6 over the entire modulating portion.

The flow of gas can therefore advantageously be finely mechanically adjusted without the need for an intervention by means of an electronic control device.

Furthermore, this guarantees the possibility of modulating the gas flow supplied to the burner without complicating the geometry of the known cocks and thereby keeping the same number of components that these known cocks already comprise.

In order to meet contingent and specific needs, an expert in the field may make several modifications and variations to the invention described above, all of which are, however, included in the scope of the invention, as defined by the following claims.

The invention claimed is:

1. A gas cock for a gas burner provided with a pilot flame, comprising:
   a cock body, wherein a plug receiving seat and a gas passage opening for passage of gas from or to the plug receiving seat are formed; and
   a conical plug, comprising a side wall which extends around a central conical plug axis and which is housed gas-tight in the plug receiving seat, said side wall comprising an inner wall surface which defines an inner cavity of the conical plug and an outer wall surface opposite to the inner wall surface, said conical plug comprising a plug opening for the passage of gas from or to the plug receiving seat through the inner cavity of the conical plug according to an adjustable angle of rotation between the cock body and the conical plug,
   wherein in the side wall of the conical plug, a groove is formed on a side of the outer wall surface, said groove being connected to the plug opening,
   wherein said groove is adapted to be positioned at least partially at the gas passage opening of the cock body as a function of the adjustable angle of rotation,
   wherein said groove comprises at least one modulating portion which extends predominantly between a first angular position and a second angular position along a circumferential direction of rotation of the conical plug,
   wherein said groove, between the first angular position and the second angular position has an increasing or decreasing depth, said depth being measured in a radial direction perpendicular to the side wall, and
   wherein downstream of the second angular position, in a direction proceeding from greater depth to smaller depth of the groove, a blind pocket is obtained, having a pocket depth greater than the depth of the groove measured at the second angular position.

2. The gas cock for a gas burner according to claim 1, wherein the groove, between the first angular position and the second angular position has a constantly increasing depth or a constantly decreasing depth.

3. The gas cock for a gas burner according to claim 1, wherein the groove is a blind groove at least in a section between the first angular position and the second angular position.

4. The gas cock for a gas burner according to claim 1, wherein the groove has a cross section lying on a plane perpendicular to the central conical plug axis, substantially in a "C" or "U" shape, with an open region facing the outer wall surface.

5. The gas cock for a gas burner according to claim 1, wherein the at least one modulating portion extends along the circumferential direction by a portion angle greater than 90°.

6. The gas cock for a gas burner according to claim 1, wherein the at least one modulating portion extends along the circumferential direction by a portion angle greater than 150°.

7. The gas cock for a gas burner according to claim 1, wherein the groove has a transverse dimension, parallel to the central conical plug axis, smaller than or equal to a transverse dimension of the plug opening.

8. The gas cock for a gas burner according to claim 1, wherein the conical plug comprises an auxiliary groove, spaced with respect to the groove in an axial direction of the central conical plug axis, said auxiliary groove extending substantially in the circumferential direction and being configured for the passage of gas towards an auxiliary opening formed in the cock body different from the gas passage opening to deliver a gas flow rate lower than a gas flow rate of the gas passage opening.

\* \* \* \* \*